US011841256B2

(12) United States Patent
Takami et al.

(10) Patent No.: US 11,841,256 B2
(45) Date of Patent: Dec. 12, 2023

(54) THERMAL FLOW VELOCITY AND FLOW RATE SENSOR, AND AIR CONDITIONER

(71) Applicant: DAIKIN INDUSTRIES, LTD., Osaka (JP)

(72) Inventors: Yuuki Takami, Osaka (JP); Kazunari Fukagawa, Osaka (JP); Ryuuichi Toyota, Osaka (JP); Natsuko Kitagawa, Osaka (JP); Yumi Aomatsu, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/300,615

(22) Filed: Apr. 14, 2023

(65) Prior Publication Data
US 2023/0314195 A1 Oct. 5, 2023

Related U.S. Application Data

(63) Continuation of application No. PCT/JP2021/037149, filed on Oct. 7, 2021.

(30) Foreign Application Priority Data

Oct. 15, 2020 (JP) .................................. 2020-174166

(51) Int. Cl.
*G01F 1/684* (2006.01)
*F24F 11/89* (2018.01)
(Continued)

(52) U.S. Cl.
CPC .............. *G01F 1/684* (2013.01); *F24F 11/89* (2018.01); *F24F 2110/10* (2018.01); *F24F 2110/30* (2018.01)

(58) Field of Classification Search
CPC . G01F 1/68–692; F24F 11/89; F24F 2110/10; F24F 2110/30
See application file for complete search history.

(56) References Cited

U.S. PATENT DOCUMENTS

| 5,189,910 A | 3/1993 | Onda |
| 8,943,913 B2 * | 2/2015 | Muziol .................. G01F 1/684 |
| | | 73/204.25 |

(Continued)

FOREIGN PATENT DOCUMENTS

| CN | 1437697 A | 8/2003 |
| EP | 1319929 A1 | 6/2003 |

(Continued)

OTHER PUBLICATIONS

Notice of Reasons for Refusal issued in corresponding Japanese Application No. 2020-174166 dated Nov. 2, 2021 (6 pages).

(Continued)

*Primary Examiner* — Justin N Olamit
(74) *Attorney, Agent, or Firm* — Osha Bergman Watanabe & Burton LLP

(57) ABSTRACT

A thermal flow velocity and flow rate sensor includes: a substrate; a heater mounted on the substrate; a temperature measuring element mounted on the substrate; a joint portion made of a resin filled between the heater and the temperature measuring element and thermally connecting the heater and the temperature measuring element; a lead wire connected to the substrate; and a fastener fixing the lead wire to the substrate. The lead wire is soldered to the substrate. The lead wire and the fastener are coated with the resin.

5 Claims, 9 Drawing Sheets

(51) Int. Cl.
    *F24F 110/30*    (2018.01)
    *F24F 110/10*    (2018.01)

(56) References Cited

U.S. PATENT DOCUMENTS

| | | | |
|---|---|---|---|
| 9,091,579 B2* | 7/2015 | Gaal | G01F 1/6842 |
| 9,989,390 B2* | 6/2018 | Tashiro | G01F 1/6842 |
| 10,697,711 B2* | 6/2020 | Ryu | F24F 12/002 |

FOREIGN PATENT DOCUMENTS

| | | |
|---|---|---|
| JP | H02-307019 A | 12/1990 |
| JP | H11-194043 A | 7/1999 |
| JP | 2003-156505 A | 5/2003 |
| JP | 2015-68659 A | 4/2015 |

OTHER PUBLICATIONS

Decision to Grant a Patent issued in corresponding Japanese Application No. 2020-174166 dated Jun. 21, 2022 (5 pages).
International Search Report issued in corresponding International Application No. PCT/JP2021/037149 dated Nov. 9, 2021 (2 pages).
English translation of International Preliminary Report on Patentability issued in corresponding International Application No. PCT/JP2021/037149 dated Apr. 27, 2023 (5 pages).

\* cited by examiner

THERMAL FLOW VELOCITY AND FLOW RATE SENSOR, AND AIR CONDITIONER

TECHNICAL FIELD

The present disclosure relates to a thermal flow velocity and flow rate sensor, and an air conditioner including the sensor.

BACKGROUND

Flow velocity and flow rate sensors include a thermal flow velocity and flow rate sensor including a single substrate equipped with a heat generating element configured to generate heat in accordance with supply current, and a temperature measuring element configured to detect temperature of the heat generated from the heat generating element. The thermal flow velocity and flow rate sensor thus configured measures flow velocity and a flow rate with reference to temperature of heat detected by the temperature measuring element, on the basis of the fact that heat generated from the heat generating element changes in accordance with flow velocity (see PATENT LITERATURE 1 and the like). The heat generating element and the temperature measuring element each have an exposed surface in the thermal flow velocity and flow rate sensor, and heat is transmitted from the heat generating element to the temperature measuring element via air existing around the heat generating element and the temperature measuring element.

PATENT LITERATURE

PATENT LITERATURE 1: Japanese Laid-Open Patent Publication No. 2015-68659.

Measurement accuracy of the thermal flow velocity and flow rate sensor is improved effectively by increase in heat transmission efficiency from the heat generating element to the temperature measuring element and a configuration enabling the temperature measuring element to detect heat generated at the heat generating element as quickly as possible. However, the heat generating element and the temperature measuring element interpose air therebetween in the thermal flow velocity and flow rate sensor. The heat transmission efficiency from the heat generating element to the temperature measuring element is principally determined in accordance with heat conductivity of air. It is accordingly difficult to increase heat transmission efficiency from the heat generating element to the temperature measuring element to improve measurement accuracy of the thermal flow velocity and flow rate sensor.

SUMMARY

One or more embodiments of the present disclosure provide a thermal flow velocity and flow rate sensor that can be improved in flow velocity and flow rate measurement accuracy, and an air conditioner including the thermal flow velocity and flow rate sensor.

A thermal flow velocity and flow rate sensor according to the present disclosure includes: a substrate; a heat generating element mounted on the substrate; a temperature measuring element mounted on the substrate; a joint portion made of a resin filled between the heat generating element and the temperature measuring element and thermally connecting the heat generating element and the temperature measuring element; a lead wire connected to the substrate; and a fixing member fixing the lead wire to the substrate, wherein the lead wire is soldered to the substrate, and the lead wire and the fixing member are coated with the resin.

DETAILED DESCRIPTION

Embodiments will be described hereinafter.

[Entire Configuration of Flow Velocity and Flow Rate Sensor]

Figure 1:
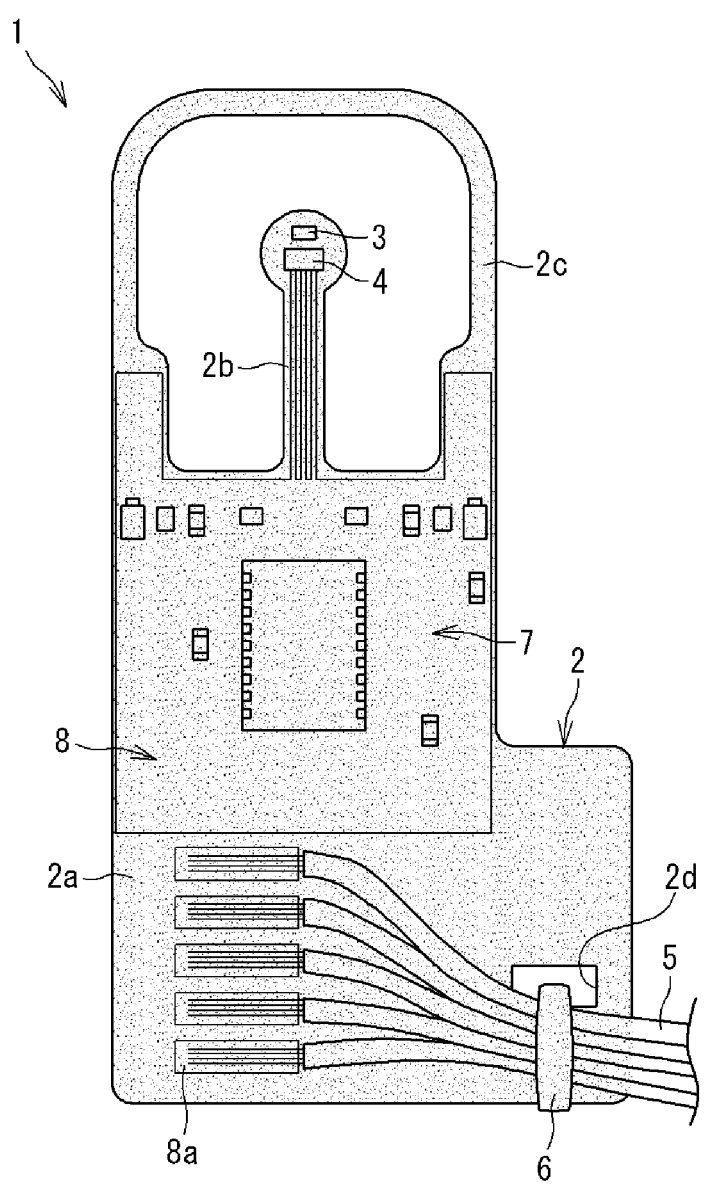
FIG. 1 is a schematic view of a thermal flow velocity and flow rate sensor according to the present disclosure.

FIG. 1 depicts a flow velocity and flow rate sensor 1 corresponding to a thermal flow velocity and flow rate sensor according to one or more embodiments of the present disclosure. The flow velocity and flow rate sensor 1 includes a substrate 2, a heat generating element 3 (i.e., heater), a temperature measuring element 4, at least one lead wire 5, and a fixing member 6 (i.e., fastener). The flow velocity and flow rate sensor 1 is a thermal flow velocity and flow rate sensor, and the temperature measuring element 4 detects temperature of heat generated from the heat generating element 3 in accordance with supply current. The flow velocity and flow rate sensor 1 detects flow velocity of air flowing around the heat generating element 3 and the temperature measuring element 4 on the basis of the fact that temperature of heat detected by the temperature measuring element 4 changes in accordance with flow velocity, and detects a flow rate with addition of a sectional area in a direction perpendicular to an air flow direction in a space where the air flows. The flow velocity and flow rate sensor 1 detects flow velocity (wind velocity) and a flow rate (wind volume) of air (wind) passing the flow velocity and flow rate sensor 1.

The substrate 2 is a plate-shaped member made of glass epoxy, which is typically used for a printed circuit board. The substrate 2 includes a first portion 2a, a second portion 2b extending to be branched from the first portion 2a, and an annular third portion 2c extending from the first portion 2a and surrounding the second portion 2b. The substrate 2 has only to be made of a material having low heat conductivity, and examples of the materials include, in addition to the glass epoxy, polyamide and ceramic.

The first portion 2a is larger in area than the second portion 2b and the third portion 2c. The second portion 2b constitutes a flow velocity and flow rate detector of the flow velocity and flow rate sensor 1, and is equipped with the heat generating element 3 and the temperature measuring element 4. The third portion 2c inhibits contact of any external object approaching the second portion 2b. The first portion 2a is provided with a through hole 2d used to fix the lead wire 5.

The first portion 2a and the second portion 2b have surfaces provided with a circuit pattern 8 formed as a thin film made of copper or the like. The heat generating element 3 and the temperature measuring element 4 are general-purpose electronic components, and are equipped such that terminals of the elements 3 and 4 are soldered at appropriate points of the circuit pattern 8 provided in the second portion 2b.

The heat generating element 3 generates heat in accordance with magnitude of supply current. The temperature measuring element 4 detects temperature of a medium increased in temperature by the heat generated at the heat generating element 3. The temperature measuring element 4 is positioned adjacent to the heat generating element 3 so as to quickly detect temperature change of the medium. However, the heat generating element 3 and the temperature measuring element 4 are mounted on the substrate 2 so as to be spaced apart from each other in order to prevent heat generated at the heat generating element 3 from being transmitted directly to the temperature measuring element 4 without being transmitted via the medium.

The circuit pattern 8 provided in the first portion 2a is equipped with an element group 7 including a plurality of elements other than the heat generating element 3 and the temperature measuring element 4. The elements included in the element group 7 are general-purpose electronic components. The circuit pattern 8 provided on the surface of the first portion 2a is partially provided with at least one land 8a.

Figure 4:
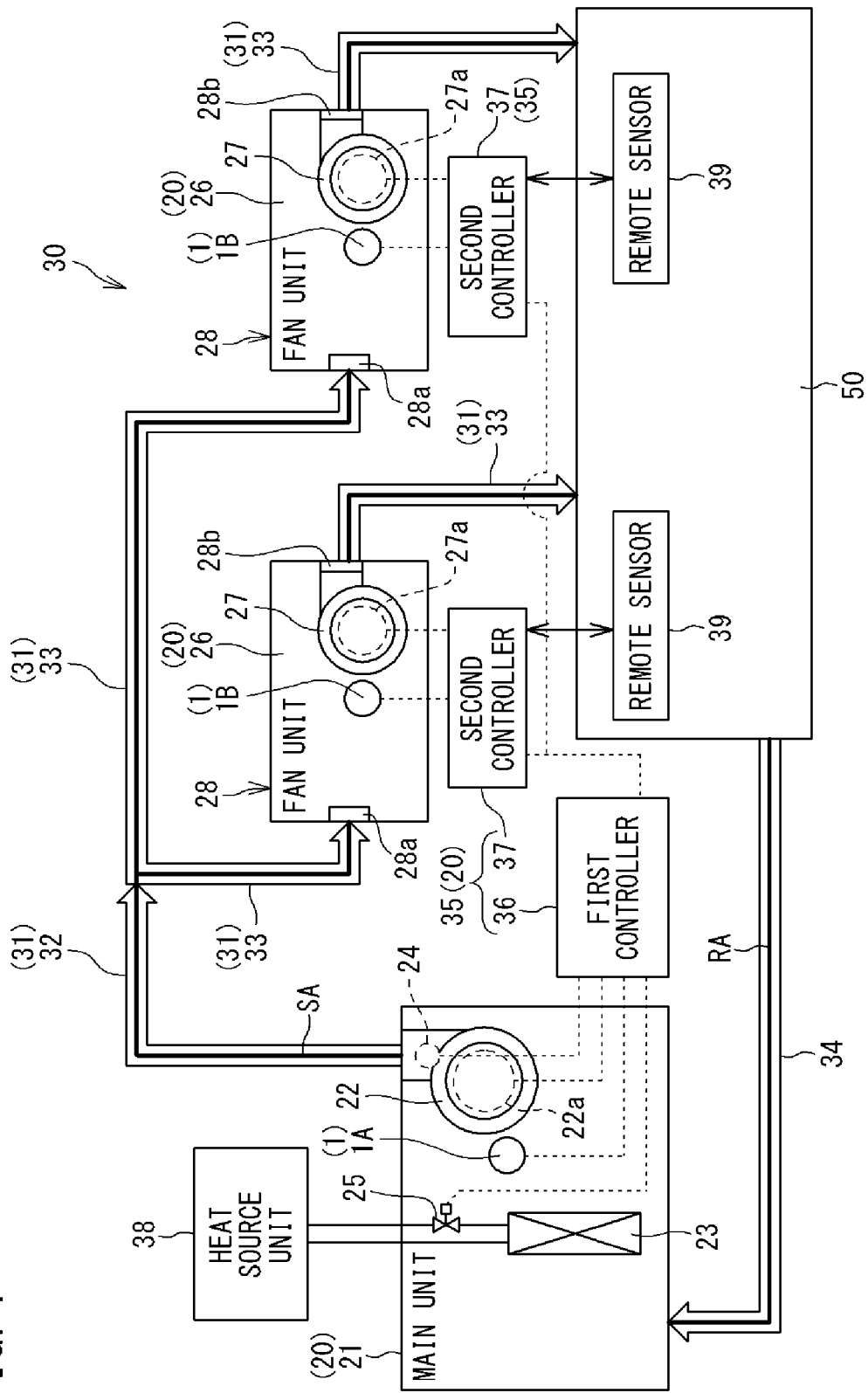
FIG. 4 is a schematic view depicting an exemplary configuration of an air conditioning system including an air conditioner according to the present disclosure.
Figure 5:
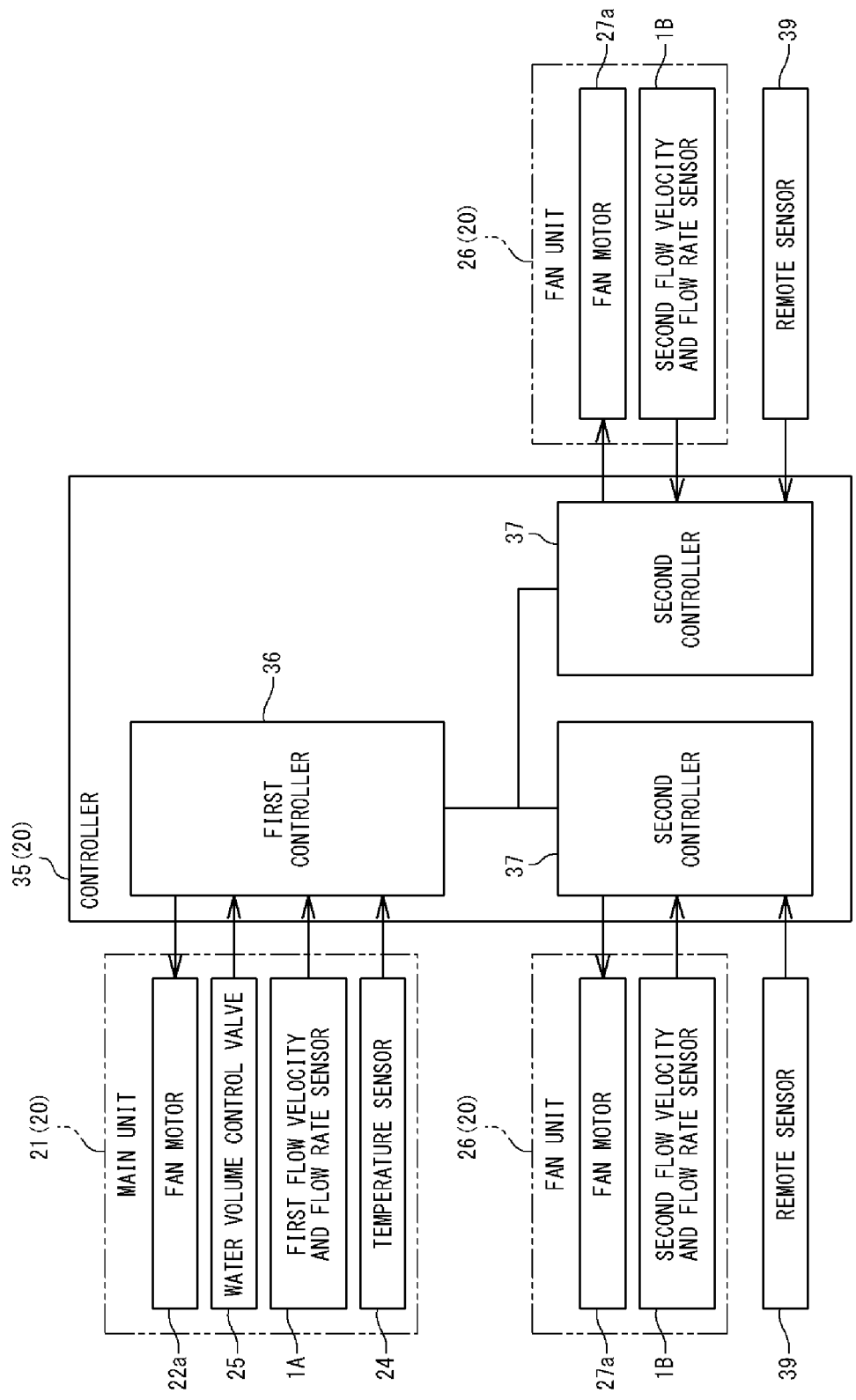
FIG. 5 is a control block diagram of the air conditioner according to the present disclosure.

The lead wire 5 is an electric wire used for supply of electric current to the elements 3 and 4 and the element group 7, and for transmission and reception of signals between the flow velocity and flow rate sensor 1 and a controller (see FIG. 4 and FIG. 5). The flow velocity and flow rate sensor 1 according to the present disclosure includes five lead wires 5 constituting a single set.

The land 8a is a portion for connection of the lead wires 5 to the circuit pattern 8. The flow velocity and flow rate sensor 1 according to the present disclosure includes five lands 8a provided on the substrate 2, and the lead wires 5 are soldered to the lands 8a one by one. The flow velocity and flow rate sensor 1 according to one or more embodiments exemplifies the case where the lead wires 5 are soldered to the circuit pattern 8. Each of the lead wires 5 may alternatively be connected to the circuit pattern 8 via a connector.

The five lead wires 5 are fixed to the substrate 2 by the fixing member 6. In the flow velocity and flow rate sensor 1 according to the present disclosure, the fixing member 6 is a resin cable tie. The lead wires 5 are tied by the fixing member 6 inserted through the through hole 2d in the substrate 2 so as to be fixed to the substrate 2. In the flow velocity and flow rate sensor 1, the first portion 2a has a substantially L shape, and the second portion 2b projects in a direction substantially perpendicular to a direction of connection of the lead wires 5 to the substrate 2.

The flow velocity and flow rate sensor 1 has a gray patterned portion in FIG. 1, and the portion is coated with a "resin". The "resin" herein corresponds to a resin 10 depicted in FIG. 2 and FIG. 3. The resin 10 is higher in heat conductivity than air, and has a property of not allowing liquid such as water to flow therethrough. In the flow velocity and flow rate sensor 1 according to the present disclosure, the resin 10 is thermosetting epoxy resin. One or more embodiments exemplify a thermosetting epoxy resin as the resin 10. The resin 10 can be appropriately selected from resins being higher in heat conductivity than air and having the property of not allowing liquid such as water to flow therethrough.

[Heat Generating Portion]

Figure 2:
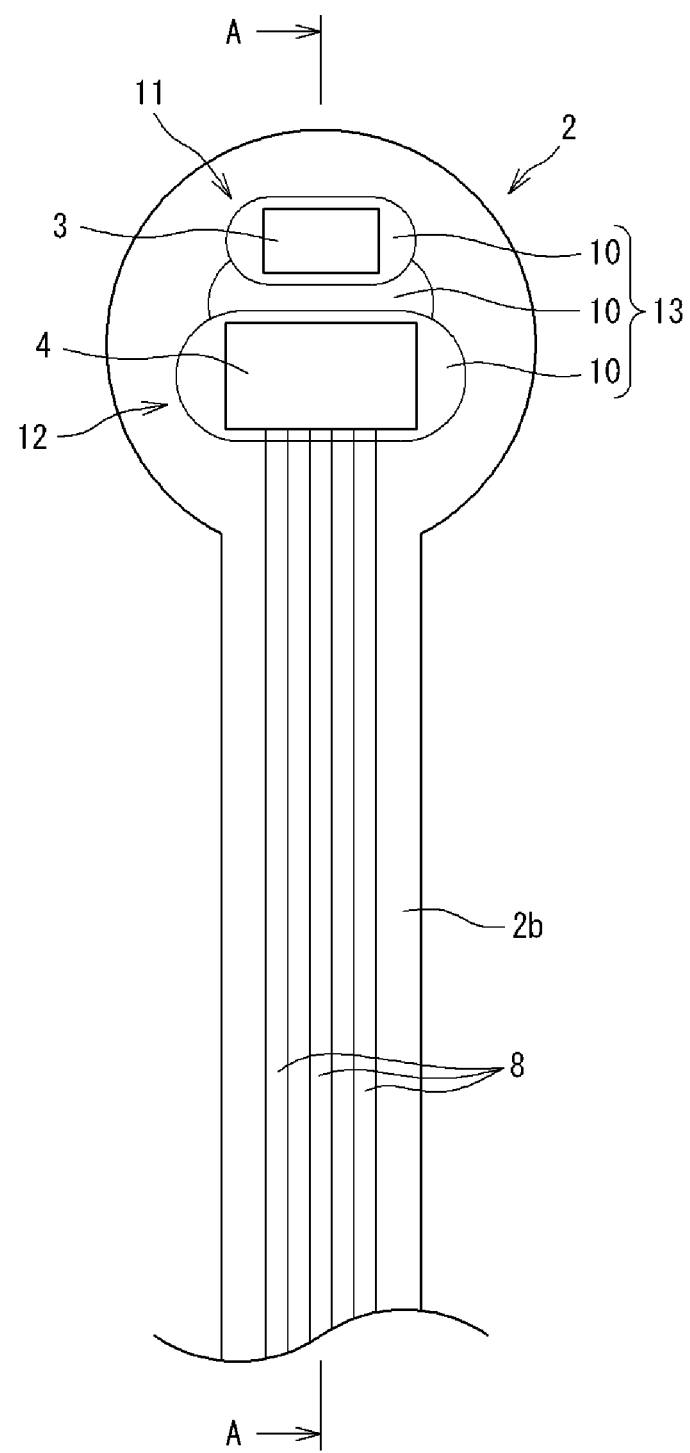
FIG. 2 is a partially enlarged schematic view of the thermal flow velocity and flow rate sensor according to the present disclosure.
Figure 3:
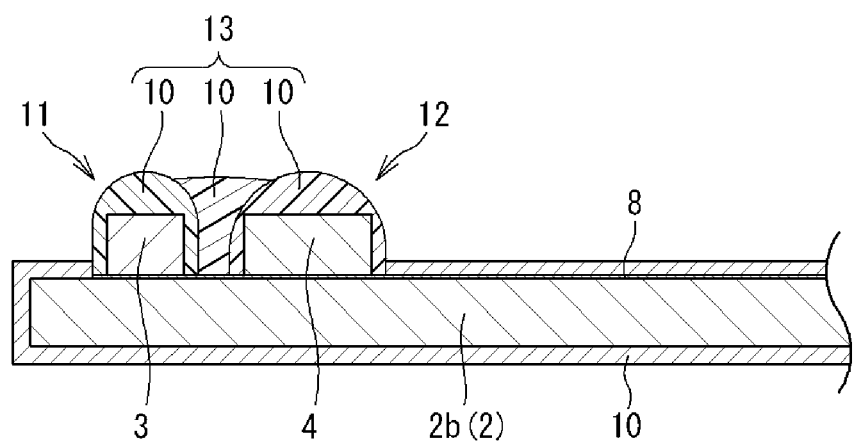
FIG. 3 is a sectional view taken along line A-A indicated in FIG. 2.

As depicted in FIG. 1 to FIG. 3, the heat generating element 3 mounted on the substrate 2 is coated with the resin 10. The following description refers to a heat generating portion 11 including the heat generating element 3 mounted on the substrate 2 and a portion provided with the resin 10 coating the heat generating element 3 (see FIG. 2 and FIG. 3).

[Temperature Measuring Portion]

The temperature measuring element 4 mounted on the substrate 2 is coated with the resin 10. The following description refers to a temperature measuring portion 12 including the temperature measuring element 4 mounted on the substrate 2 and a portion provided with the resin 10 coating the temperature measuring element 4 (see FIG. 2 and FIG. 3).

[Joint Portion]

As depicted in FIG. 2 and FIG. 3, the resin 10 fills a space between the heat generating portion 11 and the temperature measuring portion 12 on the substrate 2 in the flow velocity and flow rate sensor 1. In the flow velocity and flow rate sensor 1, the resin 10 in the heat generating portion 11, the resin 10 in the temperature measuring portion 12, and the resin 10 filled therebetween constitute a joint portion 13. The joint portion 13 thermally connects, by means of the resin 10, the heat generating element 3 and the temperature measuring element 4. The joint portion 13 according to one or more embodiments includes the resin 10 existing outside a gap between the heat generating element 3 and the temperature measuring element 4. The joint portion 13 may alternatively be formed only by the resin 10 existing in the gap between the heat generating element 3 and the temperature measuring element 4.

For convenience of description, FIG. 2 and FIG. 3 indicate boundaries for the heat generating portion 11, the temperature measuring portion 12, and the resin 10 provided therebetween. The portions 11 and 12 and the resin 10 may alternatively be provided integrally without any boundaries.

The expression "thermally connect" herein indicates a state where the heat generating element 3 and the temperature measuring element 4 are disposed to be heat exchangeable via the resin 10, and excludes a case where the heat generating element 3 and the temperature measuring element 4 are disposed in direct contact with each other so as to be heat exchangeable.

In the flow velocity and flow rate sensor 1, the heat generating element 3 and the temperature measuring element 4 are thermally connected to each other via the joint portion 13 made of the resin 10. In the flow velocity and flow rate sensor 1, heat generated at the heat generating element 3 is transmitted to the temperature measuring element 4 via the resin 10.

The thermosetting epoxy resin has heat conductivity from about 0.17 W/(mK) to about 0.21 W/(mK), and air has heat conductivity of about 0.0246 W/(mK) at 280 K. Accordingly, the heat conductivity of the thermosetting epoxy resin is higher by about ten times than the heat conductivity of air. In comparison to a case where the heat generating element 3 and the temperature measuring element 4 interpose air therebetween, the heat generating element 3 and the temperature measuring element 4 interposing the resin 10 have higher heat transmission efficiency from the heat generating element 3 to the temperature measuring element 4.

As described above, the flow velocity and flow rate sensor 1 according to the present disclosure includes the substrate 2, the heat generating element 3 mounted on the substrate 2, the temperature measuring element 4 mounted on the substrate 2, and the joint portion 13 made of the resin 10 filled between the heat generating element 3 and the temperature measuring element 4 and thermally connecting the heat generating element 3 and the temperature measuring element 4.

In the flow velocity and flow rate sensor 1 according to the present disclosure, the resin 10 is interposed between the heat generating element 3 and the temperature measuring element 4. The resin 10 is higher in heat conductivity than air. In comparison to the case where air is interposed between the heat generating element 3 and the temperature measuring element 4, the resin 10 improves heat transmission efficiency from the heat generating element 3 to the temperature measuring element 4. The flow velocity and flow rate sensor 1 is thus improved in temperature measurement accuracy of the temperature measuring element 4 for heat generated at the heat generating element 3. The flow velocity and flow rate sensor 1 is accordingly improved in flow velocity and flow rate measurement accuracy than a flow velocity and flow rate sensor including a heat generating element and a temperature measuring element that interpose air therebetween.

As described above, the flow velocity and flow rate sensor 1 according to the present disclosure includes the heat generating portion 11 where the heat generating element 3 is coated with the resin 10, and the temperature measuring portion 12 where the temperature measuring element 4 is coated with the resin 10. The heat generating element 3 and the temperature measuring element 4 are each coated with the resin 10 in the flow velocity and flow rate sensor 1, to inhibit any moisture or dust adhering to a surface of the flow velocity and flow rate sensor 1 from adhering directly to the heat generating element 3 and the temperature measuring element 4. The flow velocity and flow rate sensor 1 can thus inhibit deterioration of the heat generating element 3 and the temperature measuring element 4 due to any moisture or dust adhering to the surface of the flow velocity and flow rate sensor 1. The flow velocity and flow rate sensor 1 can accordingly inhibit deterioration in measurement accuracy due to any moisture or dust adhering to the surface. The flow velocity and flow rate sensor 1 thus configured can be disposed in a place where dew condensation is likely to occur.

[Coating Element Group]

As depicted in FIG. 1, in the flow velocity and flow rate sensor 1, the element group 7 excluding the heat generating element 3 and the temperature measuring element 4 is coated with a resin (the resin 10 depicted in FIG. 2 and FIG. 3).

As depicted in FIG. 1, the element group 7 is disposed on the substrate 2 to have an area larger than an area where the heat generating element 3 and the temperature measuring element 4 are disposed. Specifically, in the flow velocity and flow rate sensor 1 according to the present disclosure, the element group 7 is disposed in the area about 30 times the area where the heat generating element 3 and the temperature measuring element 4 are disposed. In the flow velocity and flow rate sensor 1 according to one or more embodiments, the resins 10 form layers coating the elements 3, 4, and 7 and being substantially equal in thickness.

In this case, the resin 10 coating the element group 7 has quantity (volume) about 30 times quantity of the resin 10 in the joint portion 13 (total quantity of the resin 10 in the heat generating portion 11, the resin 10 in the temperature measuring portion 12, and the resin 10 interposed therebetween). In the flow velocity and flow rate sensor 1, the resin 10 coating the element group 7 accordingly has quantity (volume) larger than total quantity (volume) of the resins 10 in the joint portion 13.

In this manner, in the flow velocity and flow rate sensor 1 according to the present disclosure, the resin 10 on the substrate 2 other than the joint portion 13 is larger in quantity than the resins 10 in the joint portion 13. In this case, heat generated from the element group 7 of the flow velocity and flow rate sensor 1 has larger quantity of heat diffused to the resin 10 outside the joint portion 13 than quantity of heat diffused to the resins 10 in the joint portion 13. Heat generated at the element group 7 can thus be inhibited from influencing temperature measurement accuracy of the temperature measuring element 4. The flow velocity and flow rate sensor 1 can accordingly inhibit deterioration in measurement accuracy.

[Entirely Coating Substrate]

As depicted in FIG. 1, in the flow velocity and flow rate sensor 1, the substrate 2 is entirely coated with a resin (the resin 10 depicted in FIG. 2 and FIG. 3). In the flow velocity and flow rate sensor 1, the resin 10 also coats portions excluding points equipped with the heat generating element 3, the temperature measuring element 4, and the element group 7.

In an exemplary case where the resin 10 coats only specific points equipped with the heat generating element 3, the temperature measuring element 4, the element group 7, and the like, coating work needs adjusting applied quantity by means of an applicator or the like and applying the resin 10 only to the specific points.

In contrast, in the case where the resin 10 entirely coats the substrate 2 including the points equipped with the heat generating element 3, the temperature measuring element 4, and the element group 7 as in the flow velocity and flow rate sensor 1, the coating work by means of the resin 10 is completed only by entirely soaking the substrate 2 in a tank reserving the resin 10. In this case, the heat generating element 3, the temperature measuring element 4, and the element group 7 can be coated with the resin 10, and the joint portion 13 can be formed simultaneously.

In the flow velocity and flow rate sensor 1 according to the present disclosure, the substrate 2 is entirely coated with the resin 10. Accordingly, the heat generating element 3 and the temperature measuring element 4 mounted on the substrate 2 can be efficiently coated with the resin 10, and the joint portion 13 can be formed efficiently. The flow velocity and flow rate sensor 1 according to the present disclosure can be efficiently manufactured only by entirely soaking the substrate 2 in the tank reserving the resin 10.

[Connection Mode of Lead Wires]

If the substrate 2 and each of the lead wires 5 have a smaller contact area at a connection point between the substrate 2 and the lead wire 5, a contact portion thereof typically has larger electrical resistance to generate more heat. As depicted in FIG. 1, in the flow velocity and flow rate sensor 1 according to the present disclosure, the lead wires 5 are soldered respectively to the lands 8a on the substrate 2. Accordingly, in the flow velocity and flow rate sensor 1, the substrate 2 and each of the lead wires 5 have a larger contact area in comparison to a case where the substrate 2 and the lead wire 5 are connected by means of a connector. This configuration can thus inhibit heat generation from the connection point between the substrate 2 and the lead wire 5.

The substrate 2 and the lead wire 5 do not interpose any connector or the like therebetween in the flow velocity and flow rate sensor 1, to efficiently discharge heat generated from the element group 7 to the lead wire 5. Heat generated at the element group 7 can thus be inhibited from influencing temperature measurement accuracy of the temperature measuring element 4. The flow velocity and flow rate sensor 1 can accordingly inhibit deterioration in measurement accuracy.

[Fixing Mode of Lead Wires]

As depicted in FIG. 1, in the flow velocity and flow rate sensor 1, the substrate 2 is entirely coated with a resin (the resin 10 depicted in FIG. 2 and FIG. 3), and the lead wires 5 and the fixing member 6 are coated with the resin 10. The lead wires 5 are fixed to the substrate 2 by the fixing member 6 in the flow velocity and flow rate sensor 1. This configuration can thus inhibit displacement of the lead wires 5 upon application of tension to the lead wires 5. The flow velocity and flow rate sensor 1 is accordingly less likely to have separation of the resin 10 coating peripheries of the lead wires 5. The flow velocity and flow rate sensor 1 according to one or more embodiments exemplifies the case where the lead wires 5 are fixed to the substrate 2 by means of the fixing member 6. The fixing member 6 may be excluded in an exemplary case where the flow velocity and flow rate sensor 1 includes the lead wires 5 each connected to the circuit pattern 8 via a connector.

[Entire Configuration of Air Conditioner]

FIG. 4 depicts an air conditioner 20 according to one or more embodiments of the present disclosure. The air conditioner 20 depicted in FIG. 4 includes a main unit 21, a plurality of fan units 26, and a controller 35.

The air conditioner 20, as well as a supply air duct 31 and a return air duct 34 connecting the air conditioner 20 and a space 50, constitute an air conditioning system 30. The space 50 serves as an air conditioning target space of the air conditioning system 30, and movement of interior air is restricted by a ceiling, a floor, and a wall. Examples of the space 50 include a room in a building. The air conditioner 20 supplies the space 50 with conditioned air and returns air in the space 50 to condition air in the space 50.

The supply air duct 31 distributes supply air SA sent from the main unit 21 to the plurality of fan units 26. The supply air duct 31 includes a main pipe 32 and a branch pipe 33 branching from the main pipe 32. The return air duct 34 returns return air RA in the space 50 to the main unit 21.

FIG. 4 representatively exemplifies the air conditioning system 30 that includes the air conditioner 20 having two fan units 26 and installed for the single space 50. The air conditioner 20 may alternatively include three or more fan units 26. The space 50 to be air conditioned by the air conditioner 20 may be divided into two or more subspaces 50. In this case, each of the subspaces 50 is provided with one or more fan units 26.

<Main Unit>

The main unit 21 includes a first flow velocity and flow rate sensor 1A, a first fan 22, a heat exchanger 23, a temperature sensor 24, and a water volume control valve 25. The first fan 22, the heat exchanger 23, the first flow velocity and flow rate sensor 1A, the temperature sensor 24, and the water volume control valve 25 are disposed in the main unit 21.

The first flow velocity and flow rate sensor 1A corresponds to the flow velocity and flow rate sensor 1 according to the present disclosure, and is positioned so as to detect flow velocity and a flow rate of air sent from the first fan 22. The flow rate detected by the first flow velocity and flow rate sensor 1A corresponds to a flow rate of air flowing in the main pipe 32 of the supply air duct 31, and also corresponds to a total flow rate of the supply air SA supplied from the plurality of fan units 26 to the space 50.

The first fan 22 is capable of sending air having the total flow rate and supplied to the space 50. Air blown out of the first fan 22 is to entirely flow into the supply air duct 31. The first fan 22 includes a fan motor 22a.

The heat exchanger 23 is supplied with cold water or the like as a heating medium, from a heat source unit 38. The heating medium supplied to the heat exchanger 23 may alternatively be warm water or the like.

The temperature sensor 24 detects temperature of the supply air SA sent from the first fan 22 to the supply air duct 31.

The water volume control valve 25 adjusts a flow rate of the heating medium supplied from the heat source unit 38 to the heat exchanger 23, and adjusts quantity of heat supplied to the return air RA passing the heat exchanger 23.

The return air RA having passed the return air duct 34 and having returned from the space 50 to the main unit 21 is sent to the supply air duct 31 through the heat exchanger 23 by means of the first fan 22. The return air RA having returned from the space 50 corresponds to air having existed in the space 50. The return air RA turns into conditioned air by heat exchange with the heating medium flowing in the heat exchanger 23 while passing the heat exchanger 23, and is sent as the supply air SA by the first fan 22.

The air conditioning system 30 according to the present disclosure has an air circulation path including a range for ventilation of the supply air SA, which will be referred to as a "secondary region" of the heat exchanger 23, and a range for ventilation of the return air RA, which will be referred to as a "primary region" of the heat exchanger 23. The secondary region of the heat exchanger 23 corresponds to a range from the heat exchanger 23 to a terminal end, adjacent to the space 50, of the branch pipe 33. The primary region of the heat exchanger 23 corresponds to a range from the space 50 to the heat exchanger 23.

Particularly when the heat source unit 38 supplies the heat exchanger 23 with cold water, the supply air SA flowing in the secondary region of the heat exchanger 23 is cooled in the heat exchanger 23 to have high relative humidity and be likely to cause dew condensation. With the supply air SA in such a state, the first flow velocity and flow rate sensor 1A disposed in the secondary region of the heat exchanger 23 may have dew condensation on a surface thereof.

<Fan Unit>

The fan units 26 each include a second flow velocity and flow rate sensor 1B, a second fan 27, and a casing 28. Each of the fan units 26 is installed at a halfway point of the branch pipe 33.

The second flow velocity and flow rate sensor 1B corresponds to the flow velocity and flow rate sensor 1 according to the present disclosure. In the air conditioner 20 according to the present disclosure, the second flow velocity and flow rate sensor 1B is installed at a bell mouth 40 provided to the second fan 27 (see FIG. 7). The second flow velocity and flow rate sensor 1B detects flow velocity and a flow rate of air sent from the second fan 27. The flow rate detected by the second flow velocity and flow rate sensor 1B corresponds to a flow rate in the branch pipe 33 connected to the corresponding fan unit 26, and also corresponds to a flow rate of the supply air SA supplied from the fan unit 26 to the space 50.

The second fan 27 supplies the space 50 with the supply air SA from the fan unit 26. The second fan 27 includes a fan motor 27a.

The casing 28 has a blow-in port 28a and a blow-out port 28b. The branch pipe 33 connects the blow-in port 28a to the main pipe 32. The branch pipe 33 connects the blow-out port 28b to the space 50. The second fan 27 sucks the supply air SA from the branch pipe 33 connected to the blow-in port 28a, and supplies the supply air SA to the branch pipe 33 connected to the blow-out port 28b.

As depicted in FIG. 4, each of the fan units 26 is disposed in the secondary region of the heat exchanger 23, and thus allows the supply air SA to flow therein. When the supply air SA flowing to the fan unit 26 has high relative humidity and is likely to cause dew condensation, the second flow velocity and flow rate sensor 1B may have dew condensation on a surface thereof.

<Controller>

As depicted in FIG. 5, the controller 35 includes a first controller 36 and a plurality of second controllers 37. The first controller 36 and each of the second controllers 37 are connected to each other.

The controller 35 is configured to receive information on a flow rate of the supply air SA (necessary supply air volume) to be supplied to the space 50 by the plurality of second fans 27.

The first controller 36 stores a flow rate control program for the first fan 22. The first controller 36 outputs necessary commands to the first fan 22 and the second controllers 37. The first controller 36 controls a number of revolutions of the fan motor 22a in the first fan 22.

The first controller 36 is connected with the first flow velocity and flow rate sensor 1A. The first flow velocity and flow rate sensor 1A detects a flow rate value to be outputted from the first flow velocity and flow rate sensor 1A to the first controller 36.

The first controller 36 is connected with the temperature sensor 24. The temperature sensor 24 detects a value (temperature) to be inputted to the first controller 36.

The first controller 36 stores, as needed, detection values of the first flow velocity and flow rate sensor 1A and the temperature sensor 24. The first controller 36 reads the stored detection values of the first flow velocity and flow rate sensor 1A and the temperature sensor 24, and calculates a flow rate target value (total target flow rate to be supplied to the space 50) of the first fan 22.

The first controller 36 stores an opening degree control program for the water volume control valve 25. The first controller 36 outputs a necessary command to the water volume control valve 25.

The second controllers 37 each store a flow rate control program for a corresponding one of the second fans 27. The second controllers 37 are provided for the fan units 26 one by one. Each of the second controllers 37 outputs a necessary command to the corresponding second fan 27.

Each of the second controllers 37 is connected with the second flow velocity and flow rate sensor 1B. The second flow velocity and flow rate sensor 1B detects a flow rate value to be inputted to the second controller 37 from the second flow velocity and flow rate sensor 1B. The flow rate detected by the second flow velocity and flow rate sensor 1B corresponds to the flow rate in the branch pipe 33, and also corresponds to supply air volume from each of the fan units 26 to the space 50.

The second controllers 37 is connected with a remote sensor 39. The remote sensor 39 functions as a temperature sensor. The remote sensor 39 is configured to output, to the corresponding second controller 37, data indicating temperature of the return air RA in the space 50.

The second controller 37 stores, as needed, the flow rate target value outputted from the first controller 36 and a detection value of the second flow velocity and flow rate sensor 1B. The second controller 37 reads the flow rate target value and the detection value of the second flow velocity and flow rate sensor 1B thus stored, and calculates a number-of-revolutions target value of the second fan 27. The second controller 37 controls a number of revolutions of the fan motor 27a in the second fan 27 in accordance with the number-of-revolutions target value thus calculated.

Each of the second controllers 37 outputs information on the necessary supply air volume to the first controller 36. The first controller 36 determines an output to be requested to the first fan 22 (the number of revolutions of the fan motor 22a) in accordance with the information on the necessary supply air volume acquired from the second controller 37.

[Flow Velocity and Flow Rate Sensor of Air Conditioner 20]

In the air conditioner 20 according to the present disclosure, the first flow velocity and flow rate sensor 1A and the second flow velocity and flow rate sensor 1B are disposed in the secondary region of the heat exchanger 23. The first flow velocity and flow rate sensor 1A and the second flow velocity and flow rate sensor 1B are each disposed in a state where dew condensation may occur on the surface.

The first flow velocity and flow rate sensor 1A and the second flow velocity and flow rate sensor 1B each correspond to the flow velocity and flow rate sensor 1 according to the present disclosure. As described earlier, the heat generating element 3 and the temperature measuring element 4 are each coated with the resin 10 in the flow velocity and flow rate sensor 1, to inhibit deterioration in flow velocity and flow rate measurement accuracy even when the surface has dew condensation. The air conditioner 20 accordingly inhibits deterioration in flow velocity and flow rate measurement accuracy even when the first flow velocity and flow rate sensor 1A and the second flow velocity and flow rate sensor 1B each have the surface provided with dew condensation.

Adoption of the flow velocity and flow rate sensor 1 according to the present disclosure achieves provision of the air conditioner 20 configured to measure supply air volume in the secondary region of the heat exchanger 23, where dew condensation is likely to occur. It is possible to provide the air conditioner 20 including the main unit 21 having the heat exchanger 23, and the plurality of fan units 26 connected to the secondary region of the heat exchanger 23 in the main unit 21 by means of the supply air duct 31, and configured to measure supply air volume of each of the fan units 26 with use of the separate flow velocity and flow rate sensor 1.

As described earlier, the heat generating element 3 and the temperature measuring element 4 are thermally connected to each other by the joint portion 13 made of the resin 10 in the flow velocity and flow rate sensor 1, for improvement in flow velocity and flow rate measurement accuracy. In the air conditioner 20, the flow rate target value of the first fan 22 is calculated with reference to the flow rate value detected by the first flow velocity and flow rate sensor 1A. The air conditioner 20 is thus improved in calculation accuracy for the flow rate target value of the first fan 22.

In the air conditioner 20, the number-of-revolutions target value of the second fan 27 is calculated with reference to the flow rate value detected by the second flow velocity and flow rate sensor 1B. The air conditioner 20 is thus improved in calculation accuracy for the number-of-revolutions target value of the second fan 27.

The air conditioner 20 according to the present disclosure is thus improved in calculation accuracy for the flow rate target value of the first fan 22 and calculation accuracy for the number-of-revolutions target value of each of the second fans 27, as well as flow rate control accuracy.

[Air Conditioner According to Different Embodiments]

Figure 6:
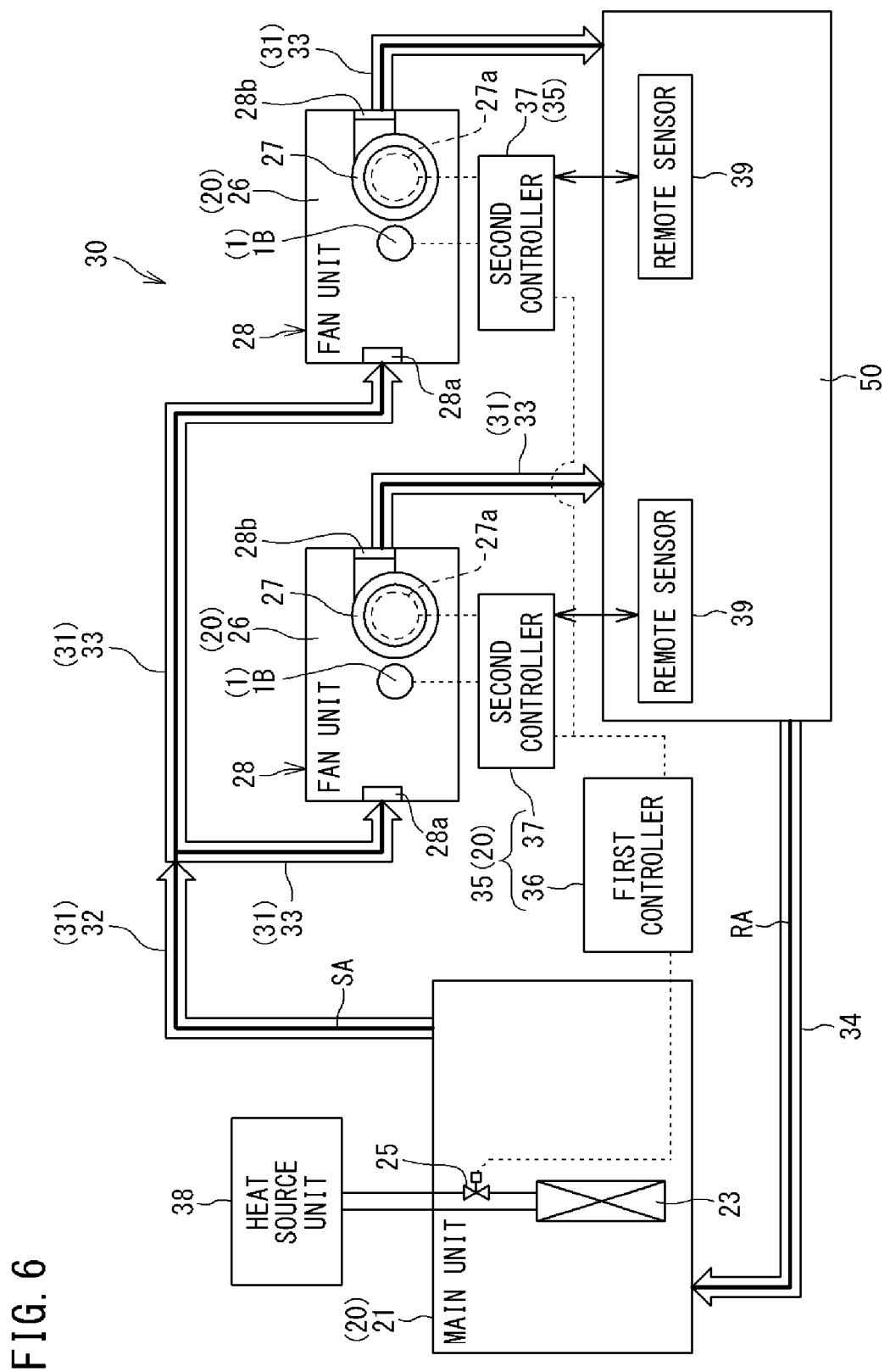
FIG. 6 is a schematic view of an air conditioner according to different embodiments of the present disclosure.

As depicted in FIG. 6, the main unit 21 in the air conditioner 20 according to the present disclosure may exclude the first fan 22, the first flow velocity and flow rate sensor 1A, and the temperature sensor 24.

When the air conditioner 20 is configured as depicted in FIG. 6, the first controller 36 acquires the detection value of the second flow velocity and flow rate sensor 1B to be inputted to the second controller 37 for each of the fan units 26. The first controller 36 calculates a flow rate of the return air RA passing the heat exchanger 23 in the main unit 21, from a sum total of the supply air SA flowing in the fan units 26.

The first controller 36 acquires a temperature detection value of the return air RA to be inputted to the second controller 37 from each of the remote sensors 39. The first controller 36 calculates quantity of heat to be supplied to the return air RA passing the heat exchanger 23 and the flow rate of the supply air SA to be sent to each of the spaces 50, from the temperature of the return air RA.

In accordance with calculation results of the quantity of heat to be supplied to the return air RA and the flow rate of the supply air SA to be sent to each of the spaces 50, the first controller 36 calculates separate flow rate target values of the second fans 27, and a command value for an opening degree necessary for the water volume control valve 25. The first controller 36 outputs a necessary command to the water volume control valve 25.

The second controllers 37 each receive the flow rate target value of the corresponding second fan 27 calculated by the first controller 36. Each of the second controllers 37 stores, as needed, the flow rate target value outputted from the first controller 36 and the detection value of the second flow velocity and flow rate sensor 1B. The flow rate value detected by the second flow velocity and flow rate sensor 1B is inputted to the second controller 37. The second controller 37 reads the flow rate target value and the detection value of the second flow velocity and flow rate sensor 1B thus stored, and calculates the number-of-revolutions target value of the second fan 27.

In the air conditioner 20 depicted in FIG. 6, the number-of-revolutions target value of each of the second fans 27 is calculated with reference to the flow rate value detected by a corresponding one of the second flow velocity and flow rate sensors 1B. The air conditioner 20 is thus improved in calculation accuracy for the number-of-revolutions target value of the second fan 27.

The air conditioner 20 depicted in FIG. 6 is accordingly improved in calculation accuracy for the number-of-revolutions target value of each of the second fans 27 and flow rate control accuracy.

As described above, the air conditioner 20 according to the present disclosure includes the heat exchanger 23 and the flow velocity and flow rate sensor 1 having the substrate 2, and the flow velocity and flow rate sensor 1 including the heat generating portion 11 having the heat generating element 3 mounted on the substrate 2 and the resin 10 coating the heat generating element 3, the temperature measuring portion 12 having the temperature measuring element 4 mounted on the substrate 2 and the resin 10 coating the temperature measuring element 4, the joint portion 13 thermally connecting the heat generating portion 11 and the temperature measuring portion 12 by means of the resin 10 filled between the heat generating portion 11 and the temperature measuring portion 12, and the flow velocity and flow rate sensor 1 is disposed in an air flow in a secondary region of the heat exchanger 23. In this case, it is possible to provide the air conditioner 20 improved in flow velocity and flow rate measurement accuracy of the flow velocity and flow rate sensor 1.

[Disposition of Flow Velocity and Flow Rate Sensor 1]

In the air conditioner 20, the second flow velocity and flow rate sensor 1B is disposed in each of the fan units 26 having a flow of the supply air SA, and the second flow velocity and flow rate sensor 1B individually measures supply air volume of each of the fan units 26. In the air conditioner 20, a corresponding one of the second controllers 37 and the first controller 36 receive a measurement value of supply air volume by each of the second flow velocity and flow rate sensors 1B and execute feedback control to more accurately match the supply air volume of each of the fan units 26 to the flow rate target value calculated by the first controller 36. The air conditioner 20 thus configured can condition air more appropriately in accordance with a state of the space 50 corresponding to each of the fan units 26.

[Attachment Mode of Flow Velocity and Flow Rate Sensor]

Figure 7:
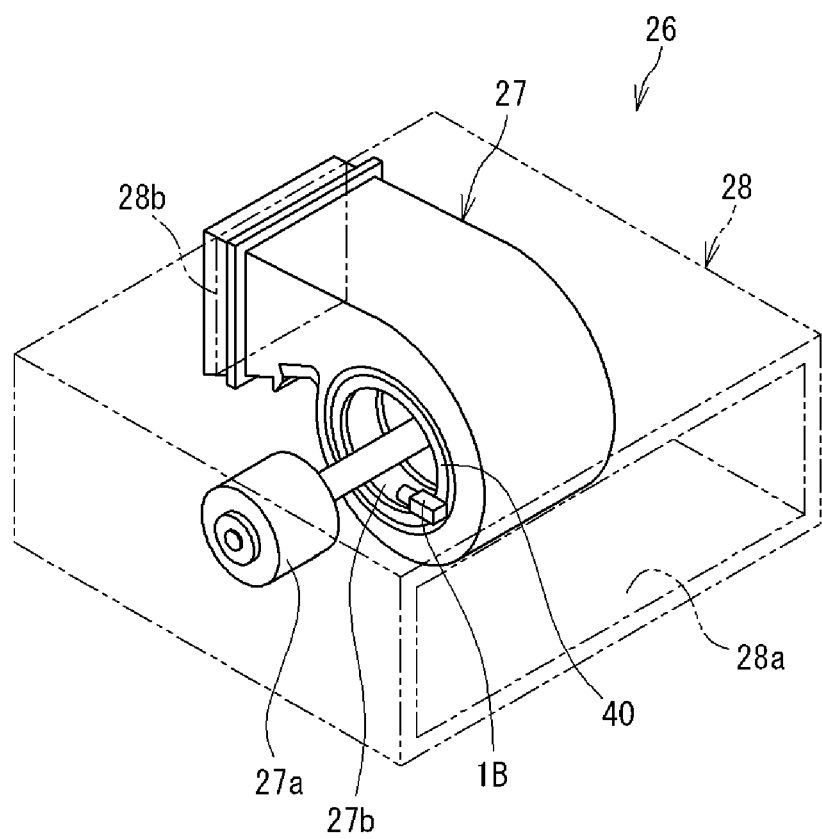
FIG. 7 is a perspective schematic view of a fan unit.

As depicted in FIG. 7, the second flow velocity and flow rate sensor 1B is attached to the bell mouth 40 provided at a blow-in port 27b of the second fan 27. The bell mouth 40 has a function of rectifying air sucked into the blow-in port 27b of the second fan 27.

Figure 8A:
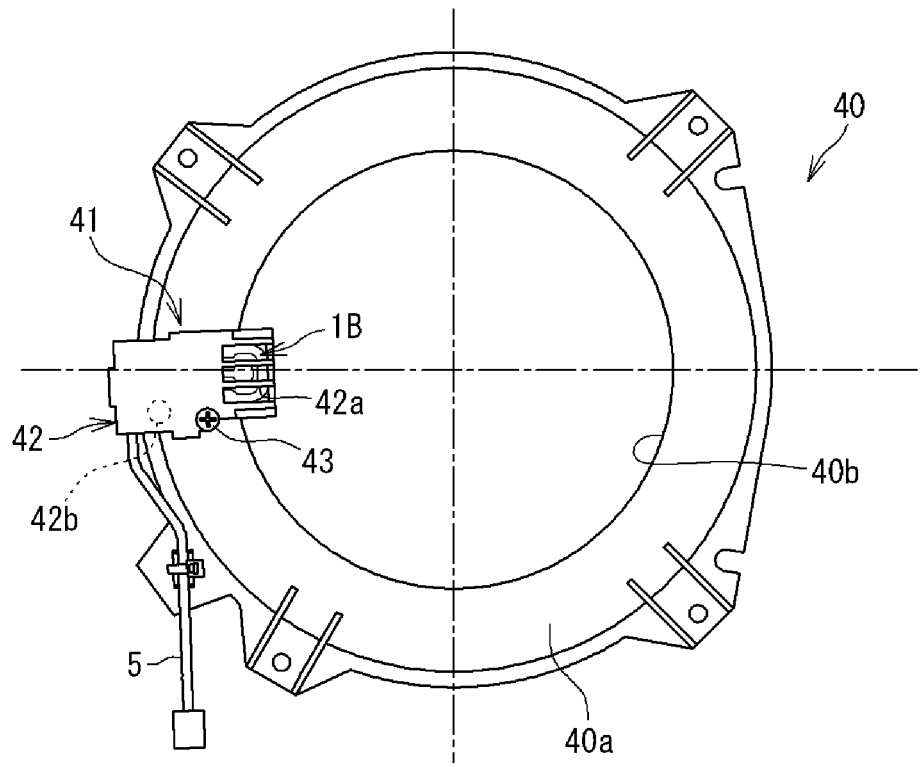
FIG. 8A is a schematic view depicting a disposition state of the thermal flow velocity and flow rate sensor with respect to a bell mouth.
Figure 8B:
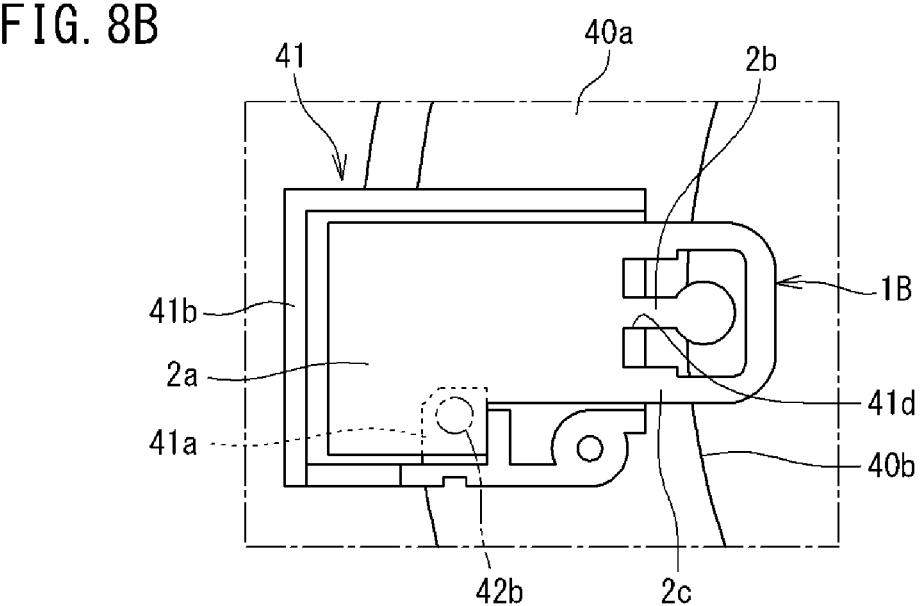
FIG. 8B is a schematic view depicting a disposition state of the thermal flow velocity and flow rate sensor with its cover being removed.
Figure 9A:
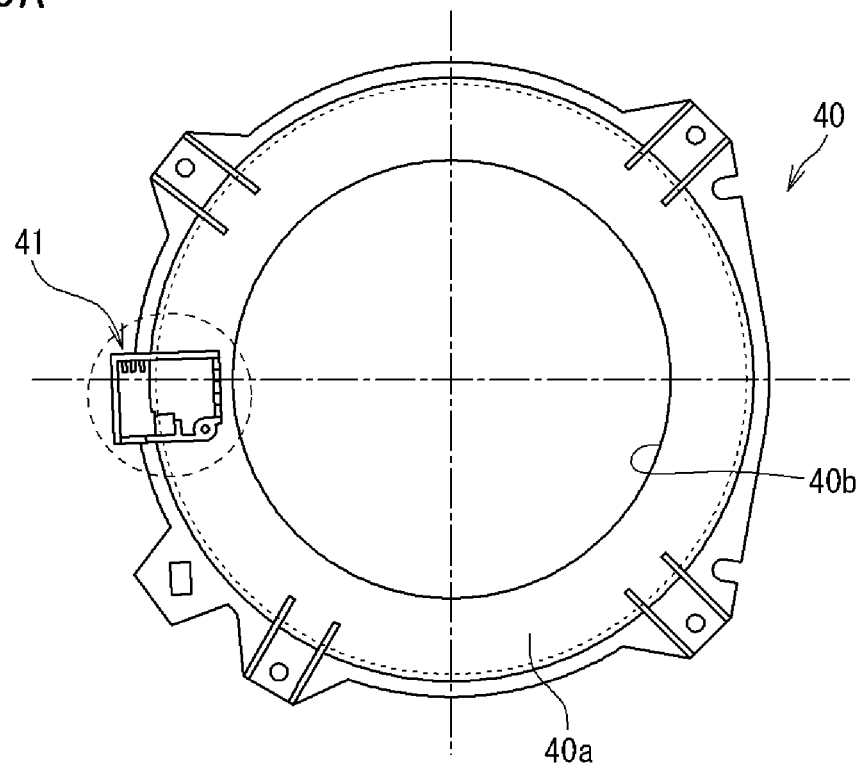
FIG. 9A is a schematic view of the bell mouth.
Figure 9B:
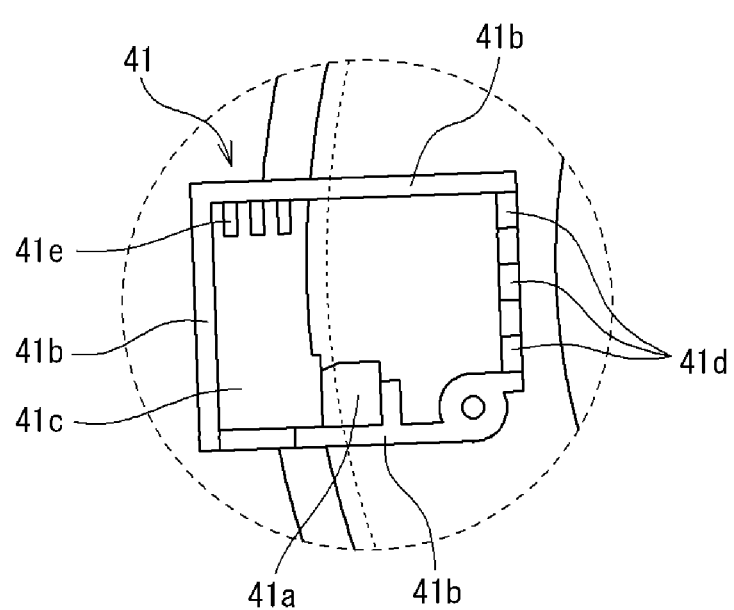
FIG. 9B is an enlarged schematic view of a holder of the bell mouth.

FIG. 8A, FIG. 8B, FIG. 9A, and FIG. 9B each depict the bell mouth 40 attached to the second fan 27. As depicted in FIG. 9A and FIG. 9B, the bell mouth 40 includes a body 40a having a ring shape. The body 40a has a radial interior provided with an air suction hole 40b. The air suction hole 40b communicates with the blow-in port 27b of the second fan 27 in a state where the bell mouth 40 is attached to the second fan 27. FIG. 9A depicts a front side of the bell mouth 40. The front side of the bell mouth 40 is opposite to a surface in contact with the second fan 27 when the bell mouth 40 is attached to the second fan 27.

The body 40a is provided with a holder 41 for disposition of the second flow velocity and flow rate sensor 1B. The holder 41 has a flat surface 41a, a wall 41b, and a bottom 41c. The flat surface 41a is perpendicular to a center axis direction of the air suction hole 40b, and is formed on the body 40a. The wall 41b is positioned to surround the flat surface 41a and projects forward from the body 40a. The bottom 41c seals a bottom surface in a range surrounded with the wall 41b and not provided with the body 40a. The wall 41b adjacent to the air suction hole 40b is provided with a plurality of grooves 41d penetrating the holder 41 from inside to outside. The bottom 41c is partially provided with a vent hole 41e.

As depicted in FIG. 8A and FIG. 8B, in the second flow velocity and flow rate sensor 1B, the first portion 2a of the substrate 2 is disposed inside the holder 41 surrounded with the wall 41b. In this case, the second portion 2b and the third portion 2c of the substrate 2 are respectively fitted in the plurality of grooves 41d, and have tip ends positioned outside the holder 41. The heat generating portion 11 and the temperature measuring portion 12 provided at the tip end of the second portion 2b are thus disposed outside the holder 41.

In the state where the second flow velocity and flow rate sensor 1B is disposed in the holder 41, the heat generating portion 11 and the temperature measuring portion 12 are positioned inside the air suction hole 40b when viewed in the center axis direction of the air suction hole 40b. The heat generating portion 11 and the temperature measuring portion 12 are disposed in an air flow sucked into the second fan 27 via the bell mouth 40.

As depicted in FIG. 8A, the air conditioner 20 according to the present disclosure is provided with a cover 42 protecting the second flow velocity and flow rate sensor 1B disposed in the holder 41. The cover 42 is fixed to the holder 41 by means of a screw 43. The cover 42 is provided with a vent hole 42a and a projection 42b.

The vent hole 42a is positioned to face the heat generating portion 11 and the temperature measuring portion 12 in the state where the cover 42 is fixed to the holder 41 by means of the screw 43. Accordingly, air sucked into the second fan 27 via the bell mouth 40 flows to peripheries of the heat generating portion 11 and the temperature measuring portion 12 through the vent hole 42a.

FIG. 8B depicts a disposition state of the second flow velocity and flow rate sensor 1B with respect to the holder 41 with the cover 42 being removed. The projection 42b is positioned to face the flat surface 41a of the holder 41 in the state where the cover 42 is fixed to the holder 41 by means of the screw 43. The projection 42b has a projecting height set such that the projection 42b and the flat surface 41a interpose a gap substantially equal to thickness of the first portion 2a in the state where the cover 42 is fixed to the holder 41 by means of the screw 43. In such a configuration, the first portion 2a of the substrate 2 is interposed between the flat surface 41a and the projection 42b in the state where the cover 42 is fixed to the holder 41 by means of the screw 43.

In the air conditioner 20, the second flow velocity and flow rate sensor 1B is interposed between the flat surface 41a and the projection 42b, to regulate displacement of the second flow velocity and flow rate sensor 1B in the holder 41. The second flow velocity and flow rate sensor 1B is thus stable in terms of its posture in the holder 41, so that the second flow velocity and flow rate sensor 1B can accurately measure the flow rate of the second fan 27.

In the flow velocity and flow rate sensor 1, the second portion 2b projects in the direction substantially perpendicular to the direction of connection of the lead wires 5 to the substrate 2. In such a configuration, the lead wires 5 led out of the holder 41 are directed along a tangent of the body 40a. Accordingly, the lead wires 5 led out of the holder 41 can be easily handled, and can be disposed in a compact manner with less protrusion of the lead wires 5 from the bell mouth 40.

At least part of the embodiments described above may be appropriately combined with each other.

[Action and Effects of Embodiments]

Measurement accuracy of the thermal flow velocity and flow rate sensor is improved effectively by increase in heat transmission efficiency from the heat generating element to the temperature measuring element and a configuration enabling the temperature measuring element to detect heat generated at the heat generating element as quickly as possible. However, the heat generating element and the temperature measuring element interpose air therebetween in the thermal flow velocity and flow rate sensor. The heat transmission efficiency from the heat generating element to the temperature measuring element is principally determined in accordance with heat conductivity of air. It is accordingly difficult to increase heat transmission efficiency from the heat generating element to the temperature measuring element to improve measurement accuracy of the thermal flow velocity and flow rate sensor.

One or more embodiments of the present disclosure provide a thermal flow velocity and flow rate sensor that can be improved in flow velocity and flow rate measurement accuracy, and an air conditioner including the thermal flow velocity and flow rate sensor.

(Action and Effects)

In one or more embodiments, the thermal flow velocity and flow rate sensor 1 includes: a substrate 2; a heat generating element 3 mounted on the substrate 2; a temperature measuring element 4 mounted on the substrate 2; and a joint portion 13 made of a resin 10 filled between the heat generating element 3 and the temperature measuring element 4 and thermally connecting the heat generating element 3 and the temperature measuring element 4; a lead wire 5 connected to the substrate 2; and a fixing member 6 fixing the lead wire 5 to the substrate 2, wherein the lead wire 5 is soldered to the substrate 2, and the lead wire 5 and the fixing member 6 are coated with the resin 10.

In the thermal flow velocity and flow rate sensor 1 thus configured, the resin 10 is interposed between the heat generating element 3 and the temperature measuring element 4. Such a resin is higher in heat conductivity then air. In comparison to a case where the heat generating element 3 and the temperature measuring element 4 interpose air therebetween, the thermal flow velocity and flow rate sensor 1 has higher heat transmission efficiency from the heat generating element 3 to the temperature measuring element 4. This configuration improves measurement accuracy of the temperature measuring element 4, for improvement in flow velocity and flow rate measurement accuracy. In this case, the substrate 2 and the lead wire 5 have a larger contact area in comparison to a case where the substrate 2 and the lead wire 5 are connected by means of a connector. This configuration can thus inhibit heat generation from a connection point between the substrate 2 and the lead wire 5. In this case, the resin 10 is less likely to be separated upon application of tension to the lead wire 5.

In one or more embodiments, the thermal flow velocity and flow rate sensor 1 further includes: a heat generating portion 11 including the heat generating element 3 coated with the resin 10; and a temperature measuring portion 12 including the temperature measuring element 4 coated with the resin 10.

In this case, the heat generating element 3 and the temperature measuring element 4 are each coated with the resin 10 to inhibit any dust, moisture, and the like from adhering to the heat generating element 3 and the temperature measuring element 4. This configuration can accordingly inhibit deterioration in flow velocity and flow rate measurement accuracy due to adhesion of dust, moisture, and the like.

In one or more embodiments, the substrate 2 may be entirely coated with the resin 10.

In this case, the heat generating element 3 and the temperature measuring element 4 mounted on the substrate 2 can be efficiently coated with the resin 10, and the joint portion 13 can be formed efficiently. The thermal flow velocity and flow rate sensor 1 can thus be manufactured efficiently.

In one or more embodiments, the resin 10 on the substrate 2 not provided with the heat generating portion 11, the temperature measuring portion 12, or the joint portion 13 may be larger in quantity than the resin 10 at the joint portion 13.

In this case, heat generated from portions other than the heat generating portion 11 and the temperature measuring portion 12 in the thermal flow velocity and flow rate sensor 1 has larger quantity of heat diffused to the resin 10 outside the joint portion 13 than quantity of heat diffused to the resin 10 in the joint portion 13. This configuration can thus inhibit heat generated at the portions other than the heat generating portion 11 and the temperature measuring portion 12 in the thermal flow velocity and flow rate sensor 1, from influencing the heat generating element 3 and the temperature measuring element 4.

In one or more embodiments, an air conditioner 20 includes: a heat exchanger 23, and a thermal flow velocity and flow rate sensor 1 including a substrate 2, a heat generating portion 11 having a heat generating element 3 mounted on the substrate 2 and a resin 10 coating the heat generating element 3, a temperature measuring portion 12 having a temperature measuring element 4 mounted on the substrate 2 and the resin 10 coating the temperature measuring element 4, and a joint portion 13 thermally connecting the heat generating portion 11 and the temperature measuring portion 12 by means of the resin 10 filled between the heat generating portion 11 and the temperature measuring portion 12, in which the thermal flow velocity and flow rate sensor 1 is disposed in an air flow in a secondary region of the heat exchanger 23.

In this case, it is possible to provide the air conditioner 20 improved in flow velocity and flow rate measurement accuracy of the thermal flow velocity and flow rate sensor 1.

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

REFERENCE SIGNS LIST 1 flow velocity and flow rate sensor
1A first flow velocity and flow rate sensor
1B second flow velocity and flow rate sensor
2 substrate
3 heat generating element
4 temperature measuring element
5 lead wire
6 fixing member
10 resin
11 heat generating portion p1 12 temperature measuring portion
13 joint portion
20 air conditioner
23 heat exchanger

What is claimed is:

1. A thermal flow velocity and flow rate sensor, comprising:
   a substrate;
   a heater mounted on the substrate;
   a temperature sensor mounted on the substrate;
   a joint portion made of a resin filled between the heater and the temperature sensor and thermally connecting the heater and the temperature sensor;
   a lead wire connected to the substrate; and
   a fastener fixing the lead wire to the substrate, wherein the lead wire is soldered to the substrate, and
   the lead wire and the fastener are coated with the resin.

2. The thermal flow velocity and flow rate sensor according to claim 1, further comprising:
   a heat generating portion comprising the heater coated with the resin; and
   a temperature measuring portion comprising the temperature sensor coated with the resin.

3. The thermal flow velocity and flow rate sensor according to claim 1, wherein the substrate is entirely coated with the resin.

4. The thermal flow velocity and flow rate sensor according to claim 2, wherein an amount of resin on the substrate neither coating the heat generating portion or the temperature measuring portion nor being at the joint portion is larger than an amount of the resin at the joint portion.

5. An air conditioner comprising:
   a heat exchanger; and
   a thermal flow velocity and flow rate sensor comprising:
      a substrate;
      a heat generating portion comprising:
         a heater mounted on the substrate; and
         a resin coating the heater;
      a temperature measuring portion comprising:
         a temperature sensor mounted on the substrate; and
         the resin coating the temperature sensor;
      a joint portion thermally connecting the heat generating portion and the temperature measuring portion by means of the resin filled between the heat generating portion and the temperature measuring portion;
      a lead wire connected to the substrate; and
      a fastener fixing the lead wire to the substrate, wherein the lead wire is soldered to the substrate,
   the lead wire and the fastener are coated with the resin, and
   the thermal flow velocity and flow rate sensor is disposed in an air flow in a secondary region of the heat exchanger.

* * * * *